United States Patent
Lieser (10) Patent No.: US 10,052,743 B1
(45) Date of Patent: Aug. 21, 2018

(54) PORTABLE VICE HAVING DUAL INDEPENDENT JAWS

(71) Applicant: Gene Lieser, Magnolia, TX (US)

(72) Inventor: Gene Lieser, Magnolia, TX (US)

( * ) Notice: Subject to any disclaimer, the term of this patent is extended or adjusted under 35 U.S.C. 154(b) by 210 days.

(21) Appl. No.: 15/246,335

(22) Filed: Aug. 24, 2016

Related U.S. Application Data (60) Provisional application No. 62/267,468, filed on Dec. 15, 2015.

(51) Int. Cl.
*B25B 1/20* (2006.01)
*B25B 1/02* (2006.01)
*A01L 11/00* (2006.01)

(52) U.S. Cl.
CPC ........... *B25B 1/20* (2013.01); *A01L 11/00* (2013.01); *B25B 1/02* (2013.01)

(58) Field of Classification Search
CPC ........... A01L 11/00; A01L 7/00; B21K 15/02
USPC ......... D8/74; 168/44; 269/201, 228, 254 CS, 269/45, 71; 279/154; 59/36–69
See application file for complete search history.

(56) References Cited

U.S. PATENT DOCUMENTS

| | | | | |
|---|---|---|---|---|
| 1,231,097 A | * | 6/1917 | Smith | A01L 11/00 168/44 |
| 1,269,813 A | * | 6/1918 | Stanford | A01L 11/00 59/56 |
| 1,369,533 A | * | 2/1921 | Nygren | B27M 3/0053 269/140 |
| 1,372,027 A | * | 3/1921 | Jacobs | B25B 1/103 269/136 |
| 2,392,558 A | | 1/1946 | Souche | |
| 2,645,144 A | * | 7/1953 | Williams | B25B 1/14 269/167 |
| 2,754,708 A | | 7/1956 | Peterson | |
| 3,400,532 A | * | 9/1968 | Smith | B21K 15/02 59/36 |
| 3,815,894 A | * | 6/1974 | Olson | B25B 1/12 269/167 |
| 4,089,160 A | * | 5/1978 | Beaston | B21D 7/022 59/56 |
| 4,284,267 A | | 8/1981 | Marben | |
| 4,632,374 A | * | 12/1986 | Yang | B25B 1/20 269/258 |

(Continued)

FOREIGN PATENT DOCUMENTS

GB    327706 A  *  4/1930  ............. B21K 15/02

OTHER PUBLICATIONS

Well Shop Ferrier Supplies, HMS Vice; http://www.well-shop.com/catalog.php?category[0]=HMS+Vice.

*Primary Examiner* — Joseph J Hail
*Assistant Examiner* — Arman Milanian
(74) *Attorney, Agent, or Firm* — Harrison Law Office, P.C.

(57) ABSTRACT

A portable vice affixed to a work bench comprising a pair of independently positioned jaws for clamping a horseshoe. A hand-operated lever simultaneously controls the interjaw distance of a pair of independent jaws gripping two differently contoured horseshoe surfaces. Two parallel stanchions are disposed symmetrically of each independent jaw pair, with each jaw pair comprising a movable jaw situated above a stationary jaw. A slidable carriage encloses a spring for each independent jaw pair and is retained laterally between the pair of parallel stanchions and vertically between a top spring retaining plate and a bottom carriage plate.

10 Claims, 5 Drawing Sheets

(56) References Cited

U.S. PATENT DOCUMENTS 5,110,100 A * 5/1992 Cotton .................. B25B 1/08
                                                  269/244

8,690,138 B2 4/2014 Lin et al.

\* cited by examiner

PORTABLE VICE HAVING DUAL INDEPENDENT JAWS

RELATED APPLICATIONS

This application claims priority based upon U.S. Provisional Application Ser. No. 62/267,468 filed Dec. 15, 2015, which is incorporated herein by reference.

FIELD OF THE INVENTION

The present invention generally relates to a vice apparatus, and more particularly, relates to a portable vice apparatus having dual-jaws conducive to independently and securely gripping irregularly shaped objects configured with varying sizes and contours.

BACKGROUND OF THE INVENTION

As is well known by practitioners in the art, a typical vice is configured with parallel jaws having opposed faces, for routinely and securely accommodating essentially planar workpieces such as conventional lumber and blocks of wood having fixed thickness throughout. Articles having varying shapes and contours such as horseshoes have been elusive to clamp securely in traditional vices especially using portable equipment and associated tools. It will be appreciated by those skilled in the art that this horseshoe clamping challenge is commonly encountered by ferriers seeking to service horses in the field, at the ranch, at exhibits, contests or rodeos.

Practitioners in the art will understand that, even if a workpiece of other article having different thickness and/or having varying contours throughout were to be firmly held in place with a conventional vice apparatus known in the art, there would still be a tendency for the object to be repositioned, twisted or otherwise become dislodged while the article is worked—because of an insufficiently secure grip. Accordingly, what is needed by ferriers and other practitioners frequently faced with the challenge of effectively clamping workpieces or articles having non-planar, contoured surfaces and irregular shapes is a portable vice that provides the capability to achieve prerequisite clamping by being emplaced at optimal locations thereupon.

Thus, the present invention teaches a dual-jaw vice that enables two locations of a horseshoe or other variously shaped and contoured article to be simultaneously clamped notwithstanding these locations having different attributes.

SUMMARY OF THE INVENTION

The present invention teaches a dual-jaw vice apparatus comprising two simultaneously independently positioned jaw members that uniquely securely grip and clamp various oddly shaped and irregularly contoured articles. Embodiments of the present invention are structured to be conveniently affixed to a workbench or like substantially flat horizontal surface, and to inherently accommodate two differently sized and differently contoured portions of an oddly shaped article regardless of the variation of physical attributes thereof.

Embodiments of the present invention comprise two substantially parallel vertical stanchion members structured symmetrically with respect to each of two pairs of independent jaw members. As will be hereinafter described, each jaw member comprises a movable jaw member disposed above a stationary jaw member. It will be appreciated by those skilled in the art that the distance between the top movable jaw member and the bottom stationary jaw member, referenced herein as "interjaw distance" for convenience and clarity, is functionally related to the physical attributes of the article being securely clamped and gripped therebetween by embodiments of the instant vice apparatus.

According to teachings of the present invention, a hand-operated single lever is provided for enabling a practitioner to apply downwardly-directed force thereto, in order to engender sufficient leverage for a camshaft, disposed beneath a slidable carriage member, to activate cam members interconnected with a camshaft. It will be seen that activation of such cam members causes the carriage member to slide upwardly, thereby compressing a pair of enclosed spring members which, in turn, cause each of the movable top jaw members to manifest an interjaw distance relative to each of the corresponding bottom stationary jaw members, commensurate with and functionally related to the implicated dimensions of the article's physical portions selected to be securely clamped and gripped therebetween. The slidable carriage member contemplated herein preferably comprises an enclosure for retaining each spring member both laterally between the pair of parallel stanchion supporting rail members and vertically between a top spring retaining plate and a bottom carriage plate. Thus, as will be hereinafter described, each of the pair of jaw-members taught herein is independently controlled by its own corresponding spring member. It will be understood that the single lever contemplated herein simultaneously effectuates compression of the spring-member pair which, in turn, causes release of both jaw-member pairs thereby either enabling the jaw-member pairs to snugly conform to surface contour of an irregularly, oddly-contoured article such as a horseshoe being emplaced therewithin, or enabling the jaw-member pairs to release proportional pressure upon the securably grasped or clamped irregularly, oddly-contoured object to facilitate its convenient removal therefrom.

It is an object and advantage of embodiments of the present invention to provide a convenient, inexpensive and portable vice for securely gripping a non-uniform, oddly or irregularly shaped article such as a horseshoe.

It is another object of the present invention to provide a vice apparatus that is configured with dual independently positioned jaws.

It is yet another object of the present invention to provide a vice apparatus that enables a practitioner to inherently and independently simultaneously control the interjaw distance between its two jaws as a function of securely gripping a horseshoe or another article having non-uniform, irregular shape attributes—by applying downward force to a hand-operated lever integrated therewith.

These and other objects and advantages of the present invention will become apparent from the following specification and accompanying drawings.

DETAILED DESCRIPTION

Reference is made herein to the figures in the accompanying drawings in which like numerals refer to like components. Referring collectively to FIGS. 1A and 1B and FIGS. 2-6, there are depicted various views of the preferred vice embodiment of the present invention. More particularly, dual-jaw vice embodiment 2 is depicted comprising first jaw member 55A and second jaw member 55B which are simultaneously opened preferably by single hand-operated lever member 85. First stanchion member 15A comprises side main frame rail member 10A is fixedly attached preferably perpendicularly to substantially planar base plate member 25 and first side slide rail member 20A disposed exteriorly of and adjacent first side main frame rail member 10A. Similarly, second stanchion member 15B comprises side main frame rail member 10B fixedly attached preferably perpendicularly to substantially planar base plate member 25 and second side slide rail member 20B disposed exteriorly of and adjacent first side main frame rail member 10B. It will become evident to those skilled in the art that each of first jaw member 55A and second jaw member 55B is automatically and independently positioned to snugly grip and clamp one of two selected variously sized and shaped portions, as appropriate, of a typically irregularly or oddly-shaped article; and functionally related to the article's physical attributes, two corresponding interjaw distances d1 and d2, respectively, will be manifest as hereinafter described.

Figure 1A:
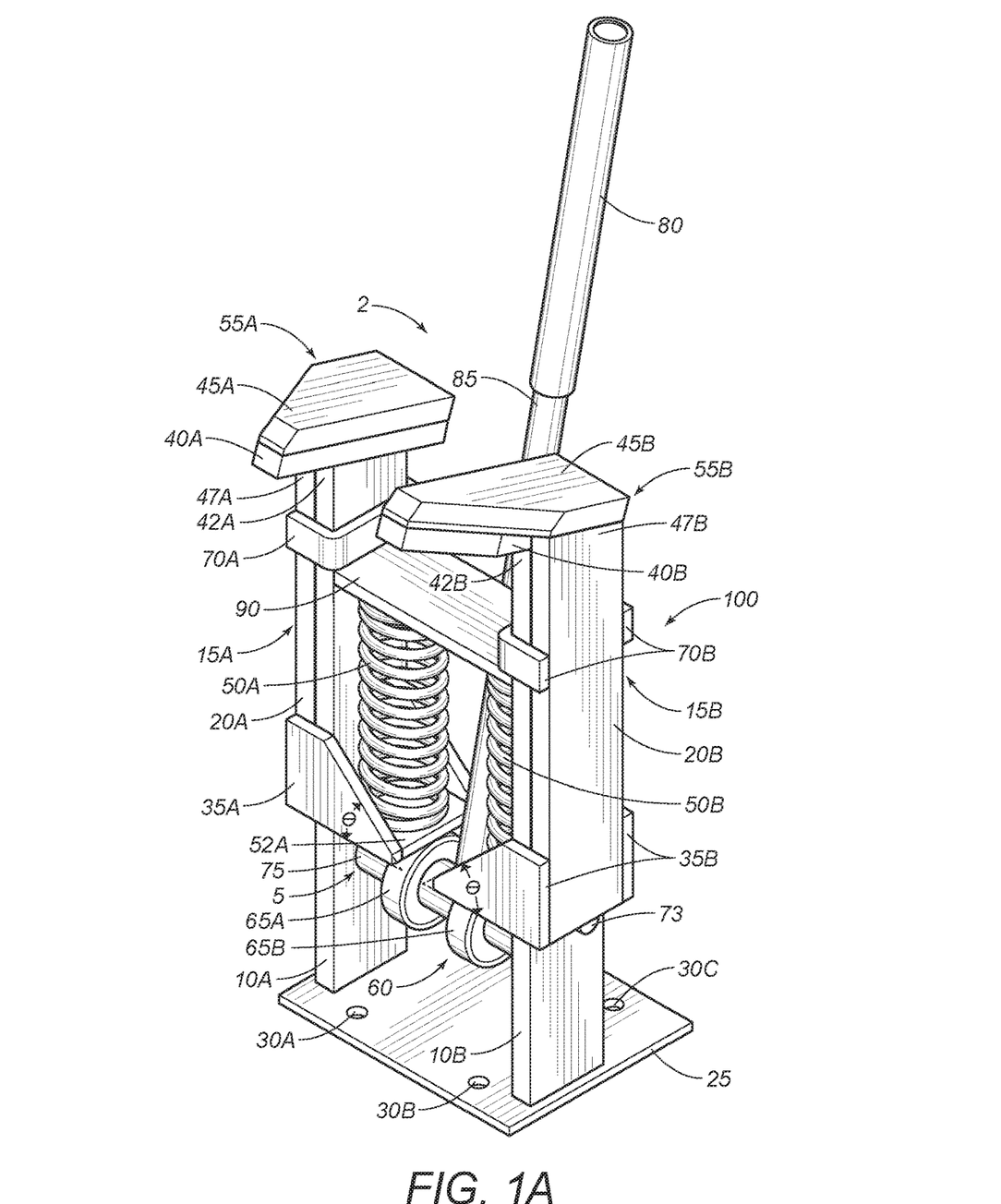
FIG. 1A depicts a frontal perspective view of a vice embodiment of the present invention, with two independent jaws disposed in a closed neutral position.
Figure 2:
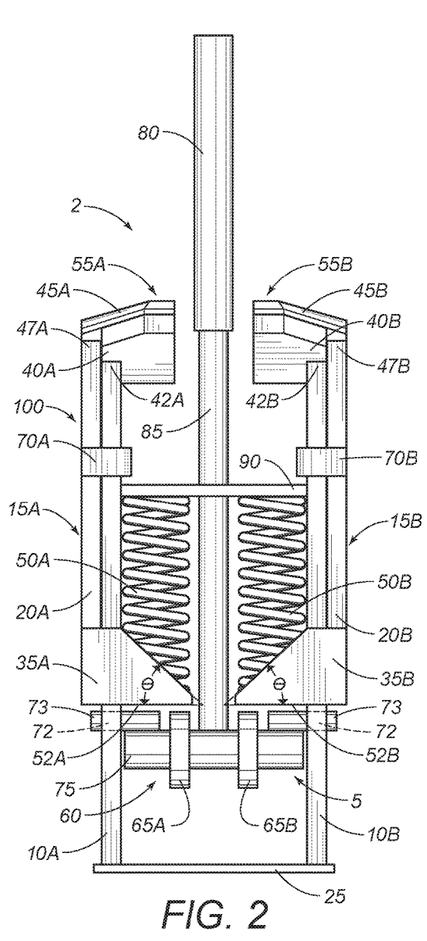
FIG. 2 depicts a front view of the vice embodiment depicted in FIG. 1A.
Figure 3:
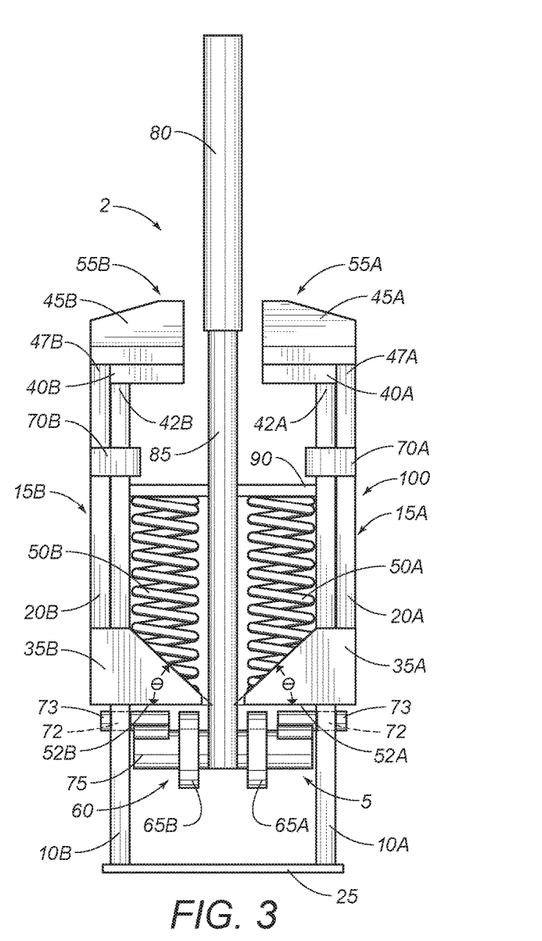
FIG. 3 depicts a rear view of the vice embodiment depicted in FIG. 1A.
Figure 4:
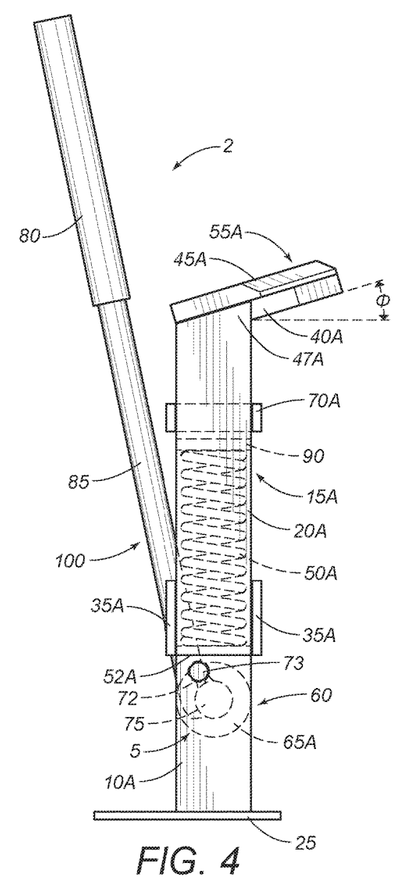
FIG. 4 depicts a right side view of the embodiment depicted in FIGS. 1A and 2.
Figure 5:
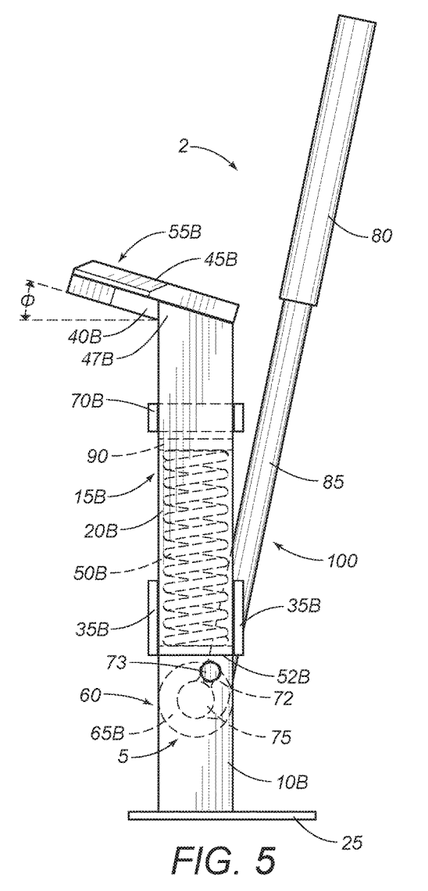
FIG. 5 depicts an opposite side view of the vice embodiment depicted in FIG. 4.

Referring collectively to the closed jaw embodiment depicted in FIGS. 1A, 2 and 3, first jaw member 55A comprises first top movable jaw member 45A disposed above and adjacent first bottom stationary jaw member 40A at interjaw distances d1. First top movable jaw member 45A is affixed at end portion thereof 47A atop first side slide rail member 20A which, in turn, is affixed at the bottom thereof to brace member pair 35A proximal to an end thereof. First bottom, stationary jaw member 40A is affixed at end thereof 42A atop first side main frame rail member 10A which, in turn, is affixed to base plate member 25 proximal to an end thereof.

Similarly, second jaw member 55B comprises second top movable jaw member 45B disposed above and adjacent second bottom stationary jaw member 40B at interjaw distances d2. Second top movable jaw member 45B is affixed at end portion thereof 47B atop second side slide rail member 20B which, in turn, is affixed at the bottom thereof to brace member pair 35B proximal to an end thereof. Similarly, second bottom, stationary jaw member 40B is affixed at end thereof 42B atop second side main frame rail member 10B which, in turn, is affixed to base plate member 25 proximal to an end thereof, opposite to the end thereof to which first side main frame rail member 10A is affixed.

The preferred dual jaw vice embodiment contemplated hereunder includes carriage member 100 supported by first stanchion member 15A spaced apart from second stanchion member 15B, and having a brace assembly for retaining a pair of compression members 50A and 50B for controlling the unique vice-gripping and clamping capabilities described herein. It will be appreciated by those skilled in the art that the vice-gripping and clamping capabilities taught hereunder are especially suited for securely accommodating irregularly, oddly shaped articles such as horseshoes and the like. More particularly, carriage member 100 is depicted with brace assembly 32 comprising two pairs of laterally spaced-apart brace members: brace members 35A and brace members 35B, respectively, for retaining compression spring members 50A and 50B. Each of first pair of brace members 35A is disposed on a side of spring member 50A and preferably perpendicularly to first carriage bottom plate member 52A, with spring member 50A retained between top retaining plate member 90 and first carriage bottom plate member 52A.

Thus, this brace assembly 32 assures that spring member 50A is securably retained both laterally between its brace member pair 35A, and vertically between top retaining plate member 90 and first carriage bottom plate member 52A. Similarly, carriage member 100 further comprises second pair of brace members 35B disposed on a side of spring member 50B and perpendicularly to second carriage bottom plate member 52B, with spring member 50B retained between top retaining plate member 90 and second carriage bottom plate member 52B. It will be appreciated by those skilled in the art that brace assembly 32 also assures that spring member 50B is securably retained both laterally between its brace member pair 35B, and vertically between top retaining plate member 90 and second carriage bottom plate member 52B. Furthermore, it will become evident that top retaining plate member 90 is affixed laterally at each opposite end thereof to first and second side main frame side rail members 10A and 10B, respectively, at a proximal lateral surface thereof.

Operationally, when dual jaw vice 2 is sitting idle on a workbench or like substantially flat horizontal surface, as depicted in FIG. 1A, handle 85 is disposed in a substantially vertical position with jaw members of vice jaw member pair 55A being situated in an abutted neutral condition, i.e., vice jaw member pair 55A being disposed in a closed position. Accordingly, when vice jaw member pair 55A is situated in a closed position, movable jaw member 45A is abuttably disposed atop stationary jaw member 40A, thereby manifesting a zero interjaw distance d1, i.e., with no space therebetween. It will be appreciated by those skilled in the art that this abutted relationship between vice jaws 40A and 45A is functionally related to spring member 50A being situated in an uncompressed neutral condition.

Simultaneously, in like fashion, when handle 85 is disposed in a substantially vertical position, vice jaw member pair 55B is situated in an abutted neutral condition, i.e., vice jaw member pair 55B being disposed in a closed position. Accordingly, when vice jaw member pair 55B is situated in a closed position, movable jaw member 45B is abuttably disposed atop stationary jaw member 40B, thereby manifesting a zero interjaw distance d2, i.e., with no space therebetween. It will be appreciated by those skilled in the art that this abutted relationship between vice jaws 40B and 45B is functionally related to spring member 50B being situated in an uncompressed neutral condition.

Figure 1B:
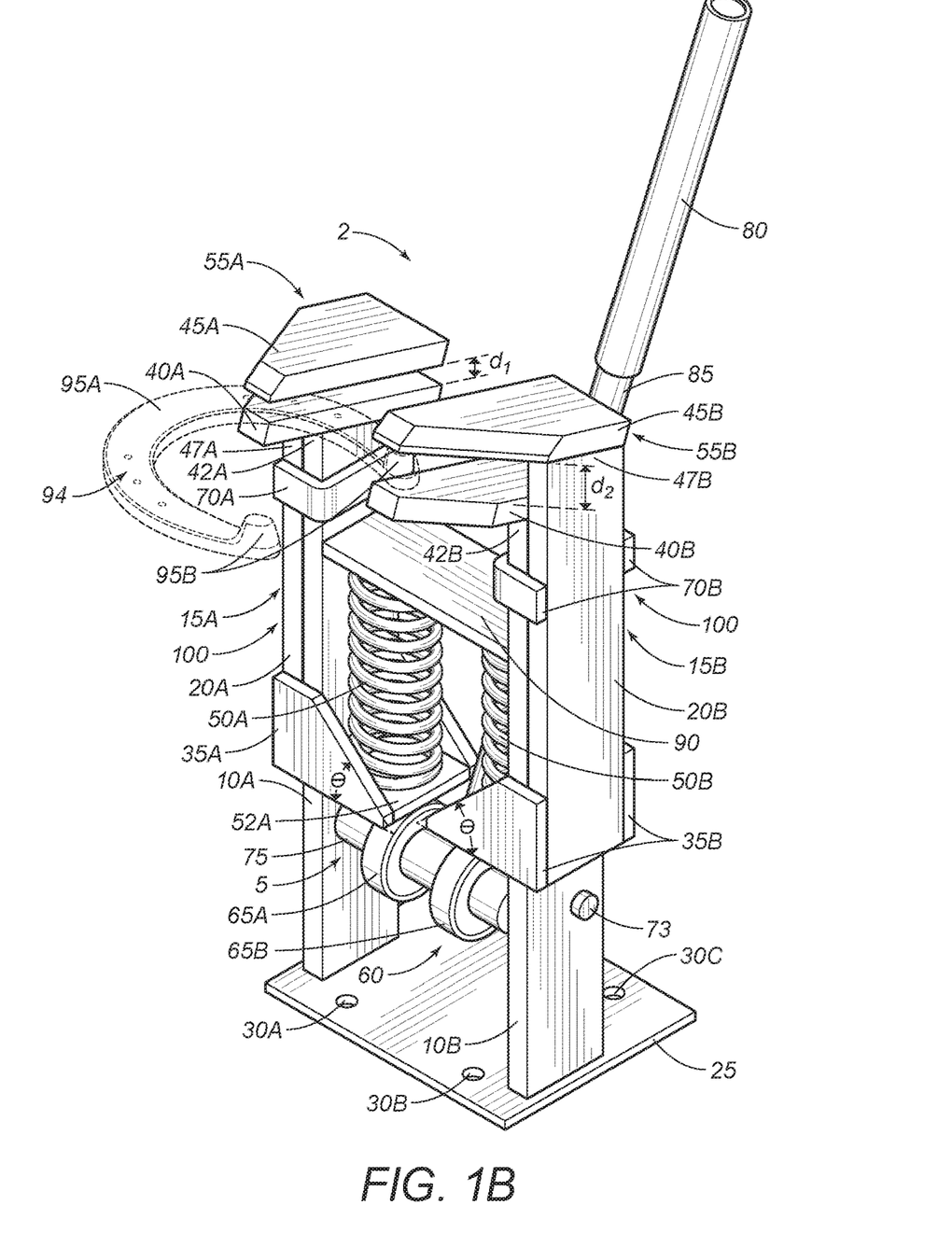
FIG. 1B depicts the vice embodiment depicted in FIG. 1A, with each of two independent jaws disposed in an open position at different interjaw distances to accommodate different portions of a horseshoe clamped in situ therebetween.
Figure 6:
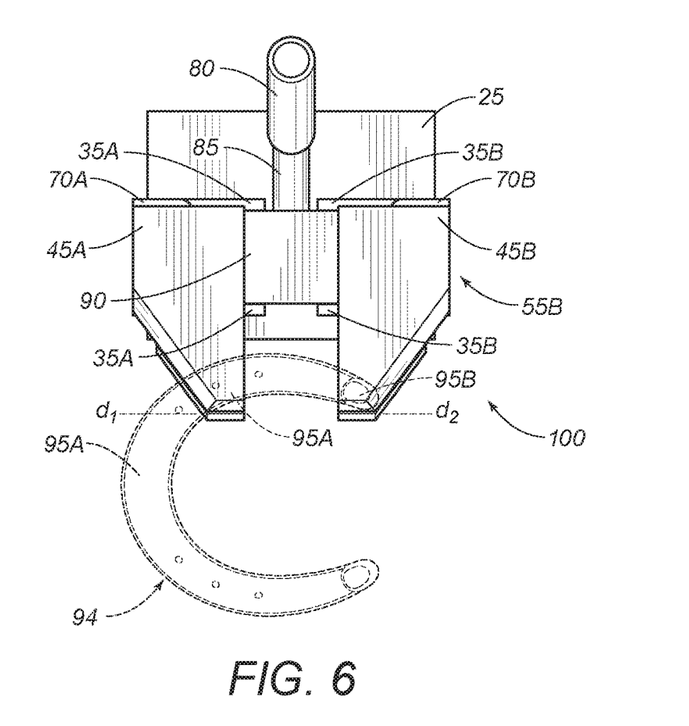
FIG. 6 depicts a top perspective view of the vice embodiment depicted in FIG. 1B, with a horseshoe clamped in situ.

On the other hand, now referring to FIGS. 1B and 6, when a ferrier practitioner downwardly urges hand-operated lever member 85 by handily engaging preferably rubberized handle grip 80 and manually applying an adequate downward force to lever member 85, each of spring members 50A and 50B is caused to synchronously be compressed—functionally related to the extent of downward movement of hand-operated lever member 85, in turn, proportionally related to the corresponding extent of simultaneous upward movement of carriage bottom plate member 52A and carriage bottom plate member 52B, respectively. As will be readily understood by those skilled in the art, relative emplacement of each of movable vice jaw members 45A and 45B is controlled by the size and contour of the article being gripped, such as horseshoe 94, but, nonetheless would be physically delimited preferably by clevis member pair 70A and 70B, respectively, which also prevent lateral motion during slide movement of movable jaw members 45A and 45B.

Thus, when horseshoe 94 is emplaced within vice jaw member pairs 55A and 55B, flat portion 95A of horseshoe 95 would be gripped and clamped by first jaw member pair 55A at a fixed corresponding first interjaw distance—d1—between upper jaw member 45A and lower jaw member 40A. Simultaneously, protruding portion thereof 95B would be gripped by second jaw member pair 55B at a second, corresponding fixed larger interjaw distance—d2—between upper jaw member 45B and lower jaw member 40B with d2 being proportionately larger than d1 as depicted. That is, the ratio of these two interjaw distances would be proportional to the relative contour-differences of the implicated portions of the article being gripped, e.g., portions 95A and 95B of horseshoe 94.

Referring now collectively to FIGS. 1A and 1B, and FIGS. 2-6, the functional relationship between hand-operated lever 85 and vice jaw member pair 55A and 55B communicated through sliding motion of carriage member 100 along substantially vertical and spaced-apart side slide rail member pair 20A and 20B will be elucidated. Substantially linear upward and downward movement of hand-operated lever member 85, pivotally mounted upon camshaft member 75, affords sufficient leverage manually applied thereto by a practitioner, thereby activating rotation via cam assembly 5 in a manner well known in the art. It will be understood that camshaft pivot pin member 73 facilitates pivoting of camshaft member 75 on side main frame rail member pair 10A and 10B, respectively, in cooperation with roller bearing members 65A and 65B of roller bearing pair 60, thereby enabling essentially frictionless upward movement, in turn, urging proportional upward linear movement of first pair of carriage bottom plate members 52A and 52B and second pair of carriage bottom plate members 52C and 52D, respectively. While embodiments of the present invention are illustrated herein with a pair of bearings, it should be obvious to those conversant in the art that a plurality of bearings may be incorporated into embodiments hereof without deviating from the scope hereof.

It should be evident that this simultaneous upward movement of first and second pairs of carriage bottom plate members causes synchronous compression of retained spring members 50A and 50B, respectively. This synchronous compression of spring members 50A and 50B imposes proportional forced upon spring retainer plate 90 thereby urging corresponding proportional upward sliding movement of carriage member 100 along pair of spaced-apart side slide rail members 20A and 20B. As depicted in FIG. 1B, the interjaw distance or interjaw separation d1 between first movable jaw member 45A and first stationary jaw member 40A is proportional to the size and contour of horseshoe portion 95A, and, similarly, the interjaw distance or interjaw separation d2 between second movable jaw member 45B and second stationary jaw member 40B is proportional to the size and contour of horseshoe portion 95B.

It has been found to be especially advantageous for securably gripping and clasping oddly, irregularly shaped articles contemplated hereunder, such as first horseshoe portion 95A and second horseshoe portion 95B, to configure each of the jaw members hereof with angle φ relative to the horizontal. Those skilled in the art will appreciate that incorporating an edge angle φ into jaw embodiments hereof preferably in the range of about 30° to about 70° effectively achieves secure gripping and clamping objectives of instant portable dual-jaw vice embodiments taught herein. To achieve gripping and clamping capabilities as contemplated hereunder, it has been found to be even more preferable for vice embodiments to have a narrower jaw member range with angle φ from about 40° to about 60°; and to achieve optimum gripping and clamping capabilities an angle φ of about 50° has been found to be most preferable. It should be clearly understood that, while the dual jaw members depicted in the embodiments displayed in the figures herein are exemplified with having the same angle φ, embodiments may, of course, be configured with a different angle for each jaw pair. For instance, such an asymmetric jaw angle configuration could prove to be advantageous if especially oddly shaped articles were contemplated to be vice-gripped in drastically differently contoured portions thereof.

Similarly, it should be apparent to those skilled in the art that chamfer angle θ incorporated into each pair of brace members 35A and 35B may vary from about 40° to about 50° to enable spring members 50A and 50B, respectively, to be expeditiously emplaced therein or removed therefrom. It has been found that a chamfer angle θ of about 45° is most preferable for conveniently achieving emplacement or replacement of this spring member pair while simultaneously affording an adequate retaining-enclosure therefor during sliding motion contemplated hereunder.

Of course, it should be evident to those skilled in the art that, since embodiments of the present invention handily accommodate oddly, irregularly-shaped objects, these two interjaw distances would typically be different from each other—since a particular feature and advantage of embodiments hereof is that each of the two jaw pairs can manifest an independent and individualized interjaw distance proportional to the physical attributes of the article section being gripped. Each side slide rail member 20A and 20B slidably accommodates upward or downward sliding movement of first movable jaw member 45A and second movable jaw member 45B, respectively, thereby causing proportional functionally related upward or downward sliding movement of carriage member 100.

It will be seen that hand operated lever member 85 is pivotally mounted upon cam shaft 75 of cam assembly 5 and affords adequate leverage for enabling a practitioner to conveniently activate cam roller bearing pair 65A and 65B. It will be appreciated that compression of corresponding spring members 50A and 50B simultaneously and synchronously with vertically upward movement of carriage member 100 causes first oddly, irregularly-shaped portion 95A of horseshoe 94 to be snugly and securely clamped and grasped within first jaw member 55A, i.e., grasped between first jaw top portion 45A and first jaw stationary bottom portion 40A; and simultaneously causes second oddly, irregularly-shaped portion 95B of horseshoe 94 to be snugly and securely grasped and clamped within second jaw member 55B, i.e., grasped between having second jaw top portion 45B and second jaw stationary bottom portion 40B.

It should likewise be evident to those skilled in the art that, once an oddly-shaped article no longer needs to be secured within the present embodiment, then a practitioner would impose downward hand-pressure once again upon handle 80 of lever 85 to urge proportional upwards movement upon carriage member 100 causing functionally related synchronous compression of spring members 50A and 50B which consequently effectuates synchronous opening of vice grip pair 55A and 55B, thereby enabling horseshoe 94 or other oddly-shaped article to be conveniently released and removed.

The following is a tabulation of the components depicted in the drawings:

| Numeral | Component | Explanation |
| --- | --- | --- |
| 2 | Dual Jaw Vice apparatus | |
| 5 | Cam assembly | Enables camshaft to pivot upon main side rails |
| 10A-B | Side main frame rail member pair | |
| 15A-B | Vertical support member pair | Comprising pair of side main frame & slide rails |
| 20A-B | Side slide rail member pair | |
| 25 | Base plate | For mounting dual jaw vice apparatus |
| 30A-D | Bolt holes for mounting main frame rail pair (10A-B) upon base plate 25 | Hole D not shown |
| 32 | Brace assembly | |
| 35A & 35B | Brace member pairs, each pair laterally spaced-apart | preferably chamfer angle Θ 45° connecting bottom spring plate (52A-B) and top jaw side rail (20A-B), creating bottom slide for slide upper rail members (20A-B) [on 10A-B] and sole mounting brace for bottom spring bracket |
| 40A, B | Bottom stationary jaw member pair | preferably angle φ 50° to promote clamping; holding object in compression from top jaw (45A-B) |
| 42A, B | End portion affixed atop a main frame slide rail member | |
| 45A, B | Top movable jaw member pair | Preferably angle φ 50° to promote clamping |
| 47A, B | End portion affixed atop an outer main frame slide rail member | |
| 50A, B | Spring member pair | Situated between top mounting plate 90 and bottom mounting plates 95A-B |
| 52A, B | Carriage bottom plate pair upon which spring member 50A rests | Retaining bottom of each spring individually in position |
| 52C, D | Carriage bottom plate pair upon which spring member 50B rests | Retaining bottom of each spring individually in position |
| 55A, B | Jaw member pair | Each having movable upper member and stationary lower member |
| 60 | Roller bearing pair | Enables frictionless camshaft movement |
| 65A-B | Roller bearing | |
| 70A, B | Clevis member pair for retaining upper slide rail member pair 20A-B | U-shaped member sustaining position of upper slide rails 20A-B as slides up & down, thereby avoiding lateral movement |
| 72 | Axial bore through which camshaft pivot pin passes & rotates | |
| 73 | Axial camshaft pivot pin | |
| 75 | Camshaft | |
| 80 | Handle grip | rubberized |
| 85 | Handle lever | |
| 90 | Top spring retaining plate | Retaining top of springs in position |
| 94 | Horseshoe | |
| 95A | Horseshoe, first portion | Flat surface |
| 95B | Horseshoe, second portion | Protruding uneven surface |
| 100 | Slide rail carriage | |

Other variations and modifications will, of course, become apparent from a consideration of the structures and techniques hereinbefore described and depicted. Accordingly, it should be clearly understood that the present invention is not intended to be limited by the particular features and structures hereinbefore described and depicted in the accompanying drawings, but that the present invention is to be measured by the scope of the appended claims.

What is claimed is:

1. A dual-jaw vice apparatus for securely gripping an irregularly oddly-shaped article having a first portion with a contour surface and a second portion also with a contour surface, said dual-jaw vice apparatus comprising:

a support member comprising a main frame rail member pair and a slide rail member pair, with each of said slide rail member pair disposed adjacent and exteriorly of each of said main frame rail member pair;

said main frame rail member pair having a first side main frame rail member fixedly attached perpendicularly to a planar surface of a substantially horizontal base plate member at one end thereof and having a second side main frame rail member fixedly attached perpendicularly at the other, opposite end of said base plate member;

a carriage member comprising a spring member pair retained within a brace assembly and disposed between said main frame member pair and slidably engaged therewith and affixed at each opposite end thereof to a slide rail member of said slide rail member pair;

said carriage member sliding from a first position disposed atop a cam assembly to a second position thereabove delimited by a spring plate member;

an independently opening and closing jaw member pair comprising:

a movable jaw member pair fixedly disposed atop said slide rail member pair; and a stationary jaw member pair fixedly disposed atop said main frame rail member pair disposed immediately below said movable jaw member pair;

a hand-operated lever pivotally interconnected with said camshaft assembly, with downward movement of said hand-operated lever functionally related to activation of rotation of said cam assembly, causing proportionally related upward movement of said carriage member, in turn, causing functionally related simultaneous compression of said spring member pair; and said upward sliding movement of said carriage member effectuating a first interjaw separation between said first movable jaw member and said first stationary jaw member for accommodating said contour surface of said first portion of said irregularly oddly-shaped article and simultaneously effectuating a second interjaw separation between said second movable jaw member and said second stationary jaw member for accommodating said contour surface of said second portion of said irregularly oddly-shaped article.

2. The dual jaw vice apparatus recited in claim 1, wherein said cam assembly comprises a cam affixed to an axial camshaft having a plurality of bearings circumferentially emplaced therearound and disposed transversely between said first side main frame rail member and said second side main frame rail member, rotatably attached thereto with a pivot pin disposed within a corresponding axial bore, and being substantially parallel to said carriage member.

3. The dual-jaw vice apparatus recited in claim 2, wherein said brace assembly comprises a pair of spaced-apart brace members with a pair of corresponding fixedly attached bottom plate members, with each said brace member pair having a spaced-apart first lateral brace member and a second lateral brace member.

4. The dual-jaw vice apparatus recited in claim 3, wherein each said lateral brace member of said brace assembly has a chamfer angle of about 40° to about 50° relative to the horizontal.

5. The dual-jaw vice apparatus recited in claim 3, wherein each said lateral brace member of said brace assembly has a chamfer angle of about 45° relative to the horizontal.

6. The dual-jaw vice apparatus recited in claim 4, wherein each said jaw of said jaw member pair has an edge angle of about 30° to about 70° relative to the horizontal.

7. The dual-jaw vice apparatus recited in claim 6, wherein each said jaw of said jaw member pair has an edge angle of about 40° to about 60° relative to the horizontal.

8. The dual-jaw vice apparatus recited in claim 7, wherein each said jaw of said jaw member pair has an edge angle of about 50° relative to the horizontal.

9. The dual-jaw vice apparatus recited in claim 6, wherein each of said side slide rail members is constrained by a corresponding pair of clevis members from exhibiting lateral movement while sliding upon said side main frame rail members.

10. The dual-jaw vice apparatus recited in claim 9, wherein one or both of said spring member pair would be removed and replaced within said corresponding one or both of said brace assembly pair.

\* \* \* \* \*